United States Patent
Nobuoka et al.

(10) Patent No.: US 9,218,174 B2
(45) Date of Patent: Dec. 22, 2015

(54) OSGI PROGRAM, OSGI SYSTEM

(75) Inventors: Shinya Nobuoka, Tokyo (JP); Yuichi Nakamura, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 171 days.

(21) Appl. No.: 14/002,811

(22) PCT Filed: Jan. 24, 2012

(86) PCT No.: PCT/JP2012/051446
§ 371 (c)(1),
(2), (4) Date: Sep. 3, 2013

(87) PCT Pub. No.: WO2013/035348
PCT Pub. Date: Mar. 14, 2013

(65) Prior Publication Data
US 2013/0346964 A1    Dec. 26, 2013

(30) Foreign Application Priority Data
Sep. 8, 2011    (JP) .................................. 2011-196060

(51) Int. Cl.
*G06F 9/44* (2006.01)
*G06F 9/45* (2006.01)
*G06F 9/445* (2006.01)
*G06F 13/10* (2006.01)

(52) U.S. Cl.
CPC .. *G06F 8/61* (2013.01); *G06F 8/60* (2013.01); *G06F 13/102* (2013.01); *G06F 8/65* (2013.01)

(58) Field of Classification Search
CPC ............. G06F 8/61; G06F 8/60; G06F 13/00; G06F 13/14; G06F 8/65; H04L 67/34; H04L 67/16; H04L 69/329; H04L 12/2809
See application file for complete search history.

(56) References Cited

U.S. PATENT DOCUMENTS 7,640,542 B2 * 12/2009 Herenyi et al. ................ 717/177
7,716,663 B2 *  5/2010 Hayes, Jr. ...................... 717/174
(Continued)

FOREIGN PATENT DOCUMENTS

| JP | 2007-241560 A | 9/2007 |
| JP | 2010-97590 A | 4/2010 |
| JP | 2010-226456 A | 10/2010 |

OTHER PUBLICATIONS

Nalla Senthilnathan, Develop and Deploy Web Services as OSGi Bundles, Oct. 14, 2009, IBM, retrieved online on Aug. 7, 2015, pp. 1-11. Retrieved from the Internet: <URL: http://www.ibm.com/developerworks/library/ws-OSGi/>.*

(Continued)

*Primary Examiner* — Thuy Dao
*Assistant Examiner* — Hanh T Bui
(74) *Attorney, Agent, or Firm* — Mattingly & Malur, PC (57) ABSTRACT

The invention automatically installs an OSGi bundle needed to use an external device connected to an electronic device having an OSGi framework mounted. The OSGi bundle is installed into the electronic device without imposing a load on a distribution system. The OSGi program related to the invention detects the external device connected to the electronic device having the OSGi framework mounted, downloads an OSGi bundle corresponding to said external device from a distribution server, and installs the OSGi bundle in the electronic device.

6 Claims, 7 Drawing Sheets

(56) References Cited

U.S. PATENT DOCUMENTS

| | | | | |
|---|---|---|---|---|
| 8,448,163 B2* | 5/2013 | Backhouse | .................... | 717/174 |
| 8,819,665 B2* | 8/2014 | Ando et al. | .................... | 717/168 |
| 8,997,089 B2* | 3/2015 | Brannen et al. | ............... | 717/174 |
| 2010/0095001 A1* | 4/2010 | Li et al. | .......................... | 709/226 |
| 2011/0055854 A1* | 3/2011 | Kawai et al. | ................... | 719/327 |
| 2011/0161954 A1* | 6/2011 | Hwang | .......................... | 717/176 |

OTHER PUBLICATIONS

Jan S. Rellermeyer et al., R-OSGi: Distributed Applications Through Software Modularization, 2007, retrieved online on Aug. 7, 2015, pp. 1-20. Retrieved from the Internet: <URL: http://delivery.acm.org/10.1145/1520000/1516126/p1-rellermeyer.pdf?>.*

OSGi Service Platform Release 4, URL: http://www.osgi.org/Release4/HomePage (obtained on Aug. 22, 2011).

* cited by examiner

| Manufacturer | Product name | Bundle symbol name | Bundle ver. | OSGi bundle |
|---|---|---|---|---|
| XXX Inc. | XXX ZigBee Controller | com.xxx.osgi.zigbee | 1.0.0 | xxxzigbee.jar |
| YY Ltd. | YY NAS | jp.yy.nas208 | 1.1.0 | yynas.jar |
| ... | ... | ... | ... | ... |

| Manufacturer | Product name |
|---|---|
| XXX Inc. | XXX ZigBee Controller |

FIG. 9

| Bundle symbol name | Bundle ver. |
|---|---|
| com.xxx.osgi.zigbee | 1.0.0 |

FIG. 10

| User ID | Bundle symbol name | Bundle ver. |
|---|---|---|
| 1234567890 | com.xxx.osgi.zigbee | 1.0.0 |

FIG. 11

OSGI PROGRAM, OSGI SYSTEM

TECHNICAL FIELD

The present invention relates to a technique for distributing OSGi bundles in compliance with OSGi framework specifications.

BACKGROUND ART

OSGi framework is a service platform that operates over Java (registered trademark) Virtual Machine and that handles Java programs as Plugin modules so that the Java programs can be dynamically added to applications. OSGi framework is developed and defined by OSGi Alliance (Non-Patent Literature 1). Java programs on an OSGi framework that are handled as Plugin modules are referred to as OSGi bundles.

Some of terminals such as gateway devices (e.g. broadband routers) installed in homes by service providers such as telecommunication carriers equip OSGi frameworks. OSGi framework plays a role for distributing applications to the gateway device and a role as an infrastructure to execute applications. The terminals equip OSGi frameworks and distribution servers distribute OSGi bundles, thereby adding or updating functions from remote sites by module units.

In some cases, gateway devices in homes may have to acquire new OSGi bundles from distribution servers. As an example, a case where a user bought a USB dongle having a ZigBee (registered trademark) communication function will be considered.

By inserting the ZigBee dongle into a USB port of the gateway device, the gateway device acquires a ZigBee communication function in terms of hardware capability. However, if the gateway device does not include communication software for performing ZigBee communications, the user cannot use the ZigBee function.

In such a case, the user searches, from Web pages of service providers or the like, OSGi bundles that are necessary for performing ZigBee communications, and downloads the OSGi bundles to install them on the gateway device in the user's home. As a result, the distribution server sends OSGi bundles for ZigBee communications to the gateway device in the home, and the gateway device is enabled to manipulate ZigBee devices using the functions of the OSGi bundles.

The user may use a Web browser as a user interface for searching the OSGi bundles. The Web browser accesses to, for example, Web pages provided by service providers. The user uses the Web browser to search required OSGi bundles, downloads the OSGi bundles, and installs the OSGi bundles on the gateway device.

Instead that a user manually searches OSGi bundles to be installed on gateway devices as described above, it is conceivable that a communication session between a distribution server and a gateway device is continuously or periodically established and the distribution server pushes OSGi bundles required by the gateway device.

CITATION LIST

Non Patent Literature

Non Patent Literature 1: OSGi Service Platform Release4, URL: http://www.osgi.org/Release4/HomePage (obtained on Aug. 22, 2011)

SUMMARY OF INVENTION

Technical Problem

If an application (OSGi bundle) that a user is attempting to install on a gateway device cooperates with specific external devices like the above-described example, the user has to search OSGi bundles in compliance with the external devices and to install the OSGi bundles on the gateway device. This imposes a heavy operational burden onto the user.

In addition, if a distribution server distributes OSGi bundles in pushing style, the distribution server has to always monitor a lot of client terminals (gateway devices). Thus the distribution system unavoidably becomes large-scaled and complicated totally. If the client terminal does not continuously require new OSGi bundles to be distributed, the pushing-style distribution system may be over engineered.

The present invention has been made to solve the problem stated above, and it is an objective of the present invention to automatically install, on electronic devices, OSGi bundles that are necessary for utilizing external devices connected with electronic devices equipped with OSGi frameworks, without imposing loads onto distribution systems.

Solution to Problem

An OSGi program according to the present invention detects external devices connected with electronic devices equipped with OSGi frameworks, downloads OSGi bundles corresponding to the external devices, and installs the OSGi bundles on the electronic devices.

Advantageous Effects of Invention

With an OSGi program according to the present invention, it is possible to install, on electronic devices, OSGi bundles corresponding to external devices only by connecting the external devices to the electronic devices equipped with OSGi frameworks. As a result, new external devices can be utilized on electronic devices without imposing operational burdens onto users. In addition, the electronic device requires distributing necessary OSGi bundles, thus it is not necessary for the distribution system to always monitor the electronic device. Therefore, loads onto the distribution system can be suppressed.

DESCRIPTION OF EMBODIMENTS

Embodiment 1

Figure 1:
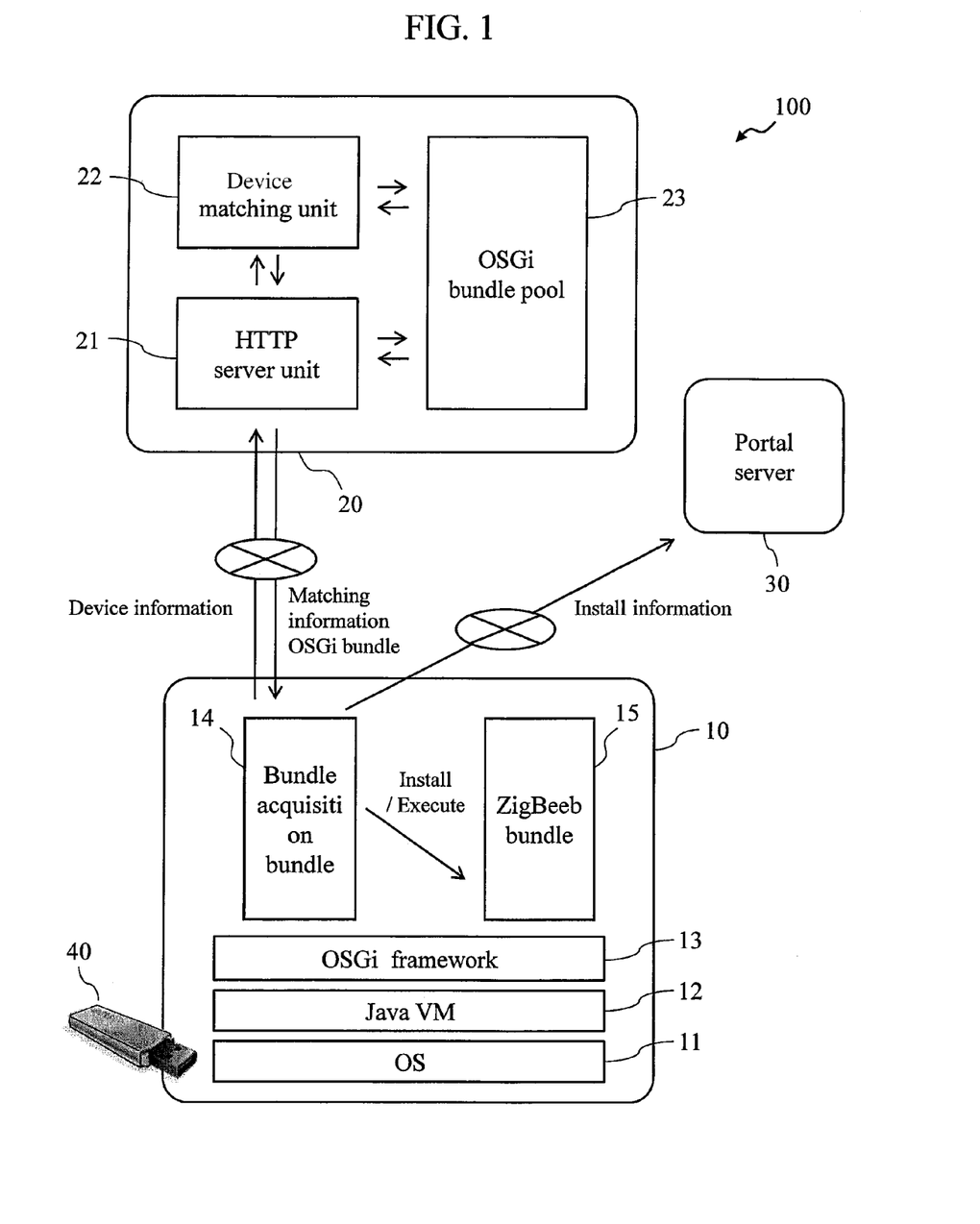
FIG. 1 is a configuration diagram of an OSGi system 100 according to an embodiment 1 of the present invention.

FIG. 1 is a configuration diagram of an OSGi system 100 according to an embodiment 1 of the present invention. The OSGi system 100 is a system providing functions in compliance with OSGi framework. The OSGi system 100 includes a gateway device 10, a distribution server 20, and a portal server 30.

The gateway device 10 is an electronic device that is installed in a user's home and is equipped with OSGi framework. The gateway device 10 includes an OS (Operating System) 11, a Java VM 12, an OSGi framework 13, and a bundle acquisition bundle 14. The gateway device 10 may include a CPU (Central Processing Unit) for executing programs, a network interface, and the like as long as necessary. A gateway device will be described as an example of an electronic device equipped with OSGi framework. However, other electronic devices may comprise the same configurations. Hereinafter, for the sake of convenience of descriptions, each of programs will be described as operational actors in some cases. However, arithmetic devices such as CPUs actually execute these programs.

The OS 11 is an OS of the gateway device 10. An OS such as Linux (registered trademark) can be used. The Java VM 12 operates on the OS 11 and executes the OSGi framework 13. The OSGi framework 13 is software implementing OSGi specification.

The bundle acquisition bundle 14 is an OSGi bundle that operates over the OSGi framework 13. The bundle acquisition bundle 14 detects that a USB device such as a ZigBee dongle 40 is connected to a USB port of the gateway device 10, downloads an OSGi bundle corresponding to the device (a ZigBee bundle 15 in this example) from the distribution server 20, installs the OSGi bundle onto the OSGi framework 13, and executes the OSGi bundle. Additionally, the bundle acquisition bundle 14 may detect UPnP (Universal Plug and Play) devices connected to a network to which the gateway device 10 belongs, and may perform similar operations.

The bundle acquisition bundle 14 notifies identification information of the newly installed OSGi bundle and a user ID to the portal server 30. The user ID is a unique ID assigned by a service provider to each of users and OSGi frameworks in the users' homes. The portal server 30 can identify each of the gateway devices 10 using the user ID.

The distribution server 20 is a server that distributes OSGi bundles to the gateway devices 10 in each of users' homes. The distribution server 20 includes a HTTP server unit 21, a device matching unit 22, and an OSGi bundle pool 23. The HTTP server unit 21 and the device matching unit 22 can be configured using hardware such as circuit devices implementing these units' functions, or can be configured using software implementing the same function and arithmetic devices such as CPUs. The OSGi bundle pool 23 can be configured using storage devices that store data.

The HTTP server unit 21 receives device identification information or bundle identification information described later from the bundle acquisition unit 14, and distributes bundle identification information or OSGi bundles corresponding to the received information. The HTTP server unit 21 can be implemented as a HTTP server.

The device matching unit 22 searches, from the OSGi bundle pool 23, bundle identification information or OSGi bundles that match with device identification information received from the bundle acquisition bundle 14. The device matching unit 22 sends the searched OSGi bundles to the bundle acquisition bundle 14 through the HTTP server unit 14.

The OSGi bundle pool 23 is a database storing OSGi bundles and bundle identification information for identifying each of OSGi bundles. The OSGi bundle pool 23 can describe data stored in the database in table format.

The portal server 30 is a server that provides various types of services through Web pages. For example, if the gateway device 10 itself does not include user interfaces, the user cannot recognize what types of OSGi bundles are installed in the gateway device 10. Thus the bundle acquisition bundle 14 notifies bundle identification information of OSGi bundles installed on the OSGi framework 13 to the portal server 30. The portal server 30 formats the received bundle identification information into a Web page format and discloses it to the user. Additionally, although not mentioned in this document, the portal server 30 may provide various services such as user information management.

Figure 2:
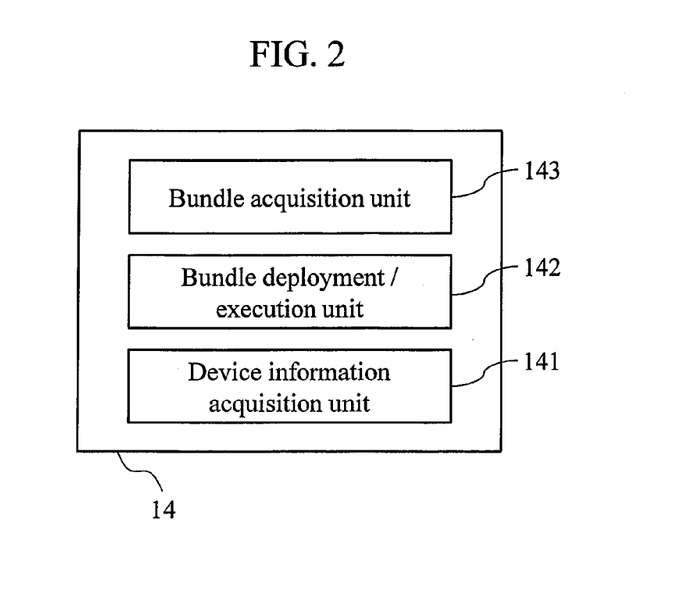
FIG. 2 is a functional block diagram of a bundle acquisition bundle 14.

FIG. 2 is a functional block diagram of the bundle acquisition bundle 14. The bundle acquisition bundle 14 includes a device information acquisition unit 141, a bundle deployment/execution unit 142, and a bundle acquisition unit 143. These functional units can be implemented as Java methods included in the bundle acquisition bundle 14.

The device information acquisition unit 141 detects that a USB device is connected to a USB port of the gateway device 10 or that an UPnP device is connected to a network to which the gateway device 10 belongs, and acquires device identification information for identifying the device. The bundle deployment/execution unit 142 installs OSGi bundles on the OSGi framework 13 and executes the OSGi bundles. The bundle acquisition unit 143 sends device identification information to the distribution server 20 and acquires OSGi bundles or bundle identification information thereof that match with the device.

Figure 3:
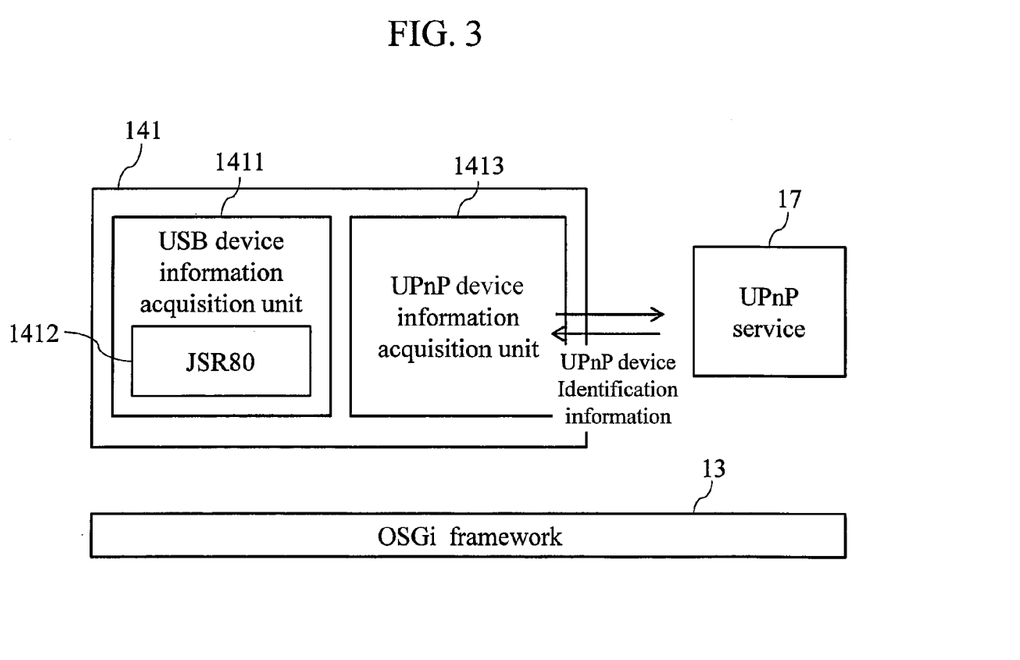
FIG. 3 is a functional block diagram of a device information acquisition unit 141.

FIG. 3 is a functional block diagram of the device information acquisition unit 141. The device information acquisition unit 141 includes a USB device information acquisition unit 1411 and an UPnP device information acquisition unit 1413.

The USB device information acquisition unit 1411 detects that a USB device is connected to the gateway device 10, and acquires identification information (e.g. manufacturer or product name, hereinafter the same applied) of the device. The UPnP device information acquisition unit 1413 detects that an UPnP device is connected to a network (LAN) to which the gateway device 10 belongs, and acquires identification information of the device.

The USB device information acquisition unit 1411 acquires identification information of USB devices using a JSR80 module 1412, which is an open-source Java library. JSR80 provides a function for detecting that a USB device is connected, and a function for acquiring properties such as manufacturers or product names of USB devices. It is assumed for the JSR80 module 1412 detecting USB devices that device drivers of the USB devices are incorporated in the OS 11. Main device drivers are included in general OS 11, thus the JSR80 module 1412 is expected to be capable of acquiring device identification information from most of USB devices.

The UPnP device information acquisition unit 1413 detects UPnP devices using an UPnP service 17, and acquires device identification information of the device. The UPnP service 17 provides interfaces for detecting UPnP devices in the same network as devices on which the OSGi framework 13 is operating, for acquiring device identification information such as manufacturers or product names, and for using functions included in the UPnP devices. The UPnP service 17 is an OSGi bundle that operates on the OSGi framework 13. The UPnP service 17 is defined as specification by OSGi Alliance and is provided in a lot of OSGi frameworks.

Figure 4:
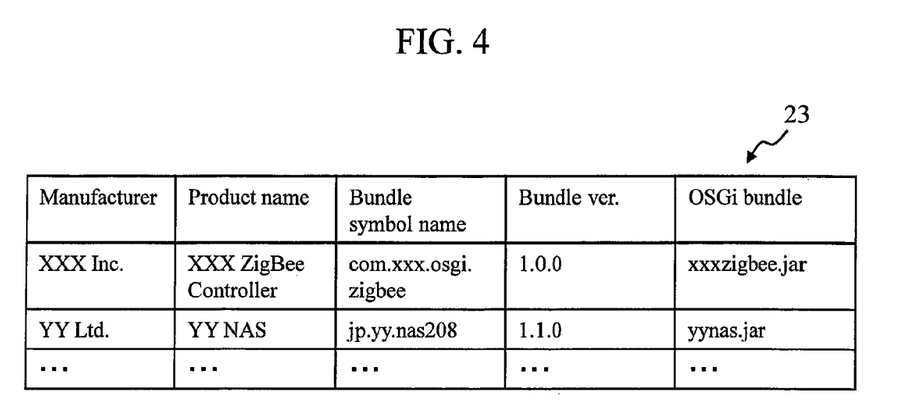
FIG. 4 is a diagram showing a configuration example of an OSGi bundle pool 23.

FIG. 4 is a diagram showing a configuration example of the OSGi bundle pool 23. The OSGi bundle pool 23 includes a table describing a relation between device identification information of external devices connected to the gateway device 10 and bundle identification information of OSGi bundles corresponding to the devices.

The device identification information can be configured using information that can be acquired from the device such as manufacturers or product names of the device. The bundle identification information can be configured using bundle symbol names and bundle version numbers that are unique to each of the OSGi bundles. OSGi specification defines that all bundles have bundle symbol names. Thus each of OSGi bundles can be identified by bundle symbol names. The bundle identification information may include file names of substantial files of OSGi bundles (jar file) to prepare for actually distributing OSGi bundles.

The device matching unit 22 acquires, from the bundle acquisition bundle 14, device identification information of external devices connected to the gateway device 10. The device matching unit 22 identifies OSGi bundles corresponding to the device by comparing the acquired device identification information with the data stored in the OSGi bundle pool 23. "OSGi bundles corresponding to the device" mentioned here are OSGi bundles that are used in some forms when using the device on the gateway device 10, such as OSGi bundles that are necessary for utilizing the device on the gateway device 10 or OSGi bundles that are preferably installed onto the gateway device 10.

Figure 5:
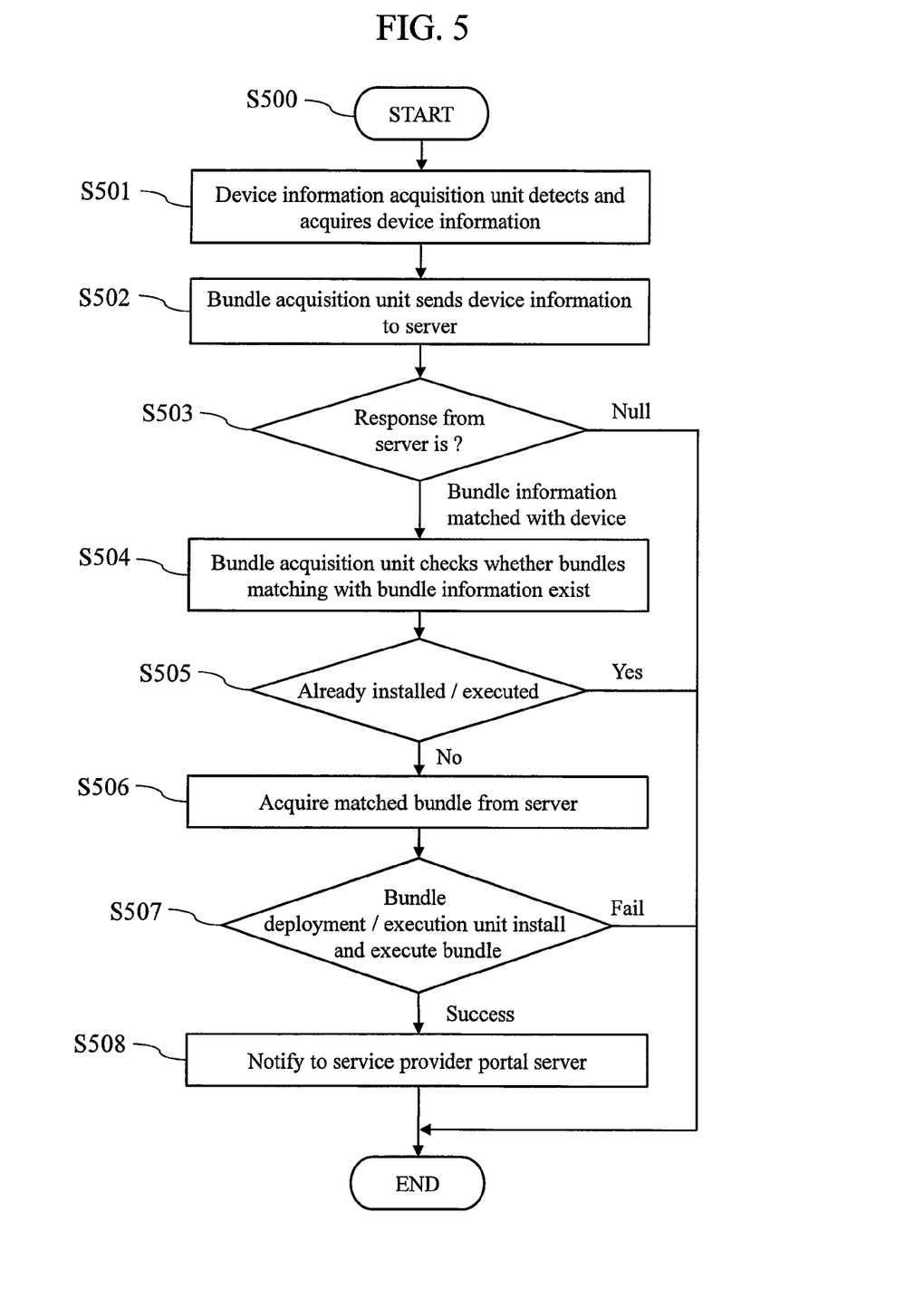
FIG. 5 is a diagram showing an operational flow of the bundle acquisition bundle 14.

FIG. 5 is a diagram showing an operational flow of the bundle acquisition bundle 14. Hereinafter, each of steps in FIG. 5 will be described.

(FIG. 5: Step S500)

Since the OSGi framework is a continuously executed framework, the bundle acquisition bundle 14 is always ready for detecting new devices. When a USB device is connected to a USB port of the gateway device 10 or a new UPnP device is connected to a network to which the gateway device 10 belongs and the device information acquisition unit 141 detects the connected device, the device information acquisition unit 141 starts this process flow.

(FIG. 5: Step S501)

The device information acquisition unit 141 acquires device identification information of the newly-detected external device, and notifies the device identification information of the device to the bundle acquisition bundle 14.

(FIG. 5: Step S502)

The bundle acquisition unit 143 sends the device identification information received from the device information acquisition unit 141 to the distribution server 20, the device identification information carried by a HTTP request. The bundle acquisition unit 143 waits for a response from the distribution server 20.

(FIG. 5: Step S503)

If the HTTP response from the distribution server 20 is Null (the body portion is empty), the bundle acquisition unit 143 terminates this process. This indicates that no OSGi bundle that matches with the sent device identification information was found. If the HTTP response includes bundle identification information, the process proceeds to step S504.

(FIG. 5: Step S503: Supplementation)

In this step, the device matching unit 22 searches, from the OSGi bundle pool 23, bundle identification information of OSGi bundles that matches with device identification information received from the bundle acquisition unit 143. The device matching unit 22 responds the searched bundle identification information to the bundle acquisition unit 143. Bundle identification information includes a bundle symbol name and a version number described in FIG. 4.

(FIG. 5: Step S504)

The bundle acquisition unit 143 checks whether an OSGi bundle matching with the bundle symbol name and the version number received in step S503 is already installed on the OSGi framework 13.

(FIG. 5: Step S504: Supplementation)

The version number is checked so as to update, if an older OSGi bundle with the same bundle symbol is installed on the OSGi framework 13, the older OSGi bundle. This mechanism enables to update OSGi bundles to newer versions for each time the gateway device 10 is connected to the network.

(FIG. 5: Step S505)

If the OSGi bundle checked in step S504 is already installed on the OSGi framework 13, this process flow is terminated. Otherwise the process flow proceeds to step S506.

(FIG. 5: Step S506)

The bundle acquisition unit 143 sends, to the distribution server 20, a HTTP request with the bundle symbol name acquired in step S503. The bundle acquisition unit 143 acquires an OSGi bundle corresponding to the bundle symbol name from the distribution server 20.

(FIG. 5: Step S506: Supplementation)

In this process flow, bundle information is acquired and it is checked whether the corresponding OSGi bundle is already installed in steps S503 to S504, and the OSGi bundle is acquired in this step only when the OSGi bundle is not installed. This is because process loads in the gateway device 10 and the distribution server 20 will be increased if the OSGi bundle is acquired each time.

(FIG. 5: Step S507)

The bundle deployment/execution unit 142 installs and executes the OSGi bundle acquired in step S506. If an OSGi bundle with the same bundle symbol name and older version number is already installed, the OSGi bundle is overwritten to be installed. If the installation successfully completed, the process flow proceeds to step S508. If failed, this process flow is terminated.

(FIG. 5: Step S508)

The bundle deployment/execution unit 142 sends, to the portal server 30, the bundle symbol name and the version number of the installed OSGi bundle and the user ID set in the OSGi framework 13. The user ID is, as described previously, an ID assigned by a service provider to the OSGi frameworks 13 of each user so as to identify each user. The user ID is not specified in OSGi framework specification.

Figure 6:
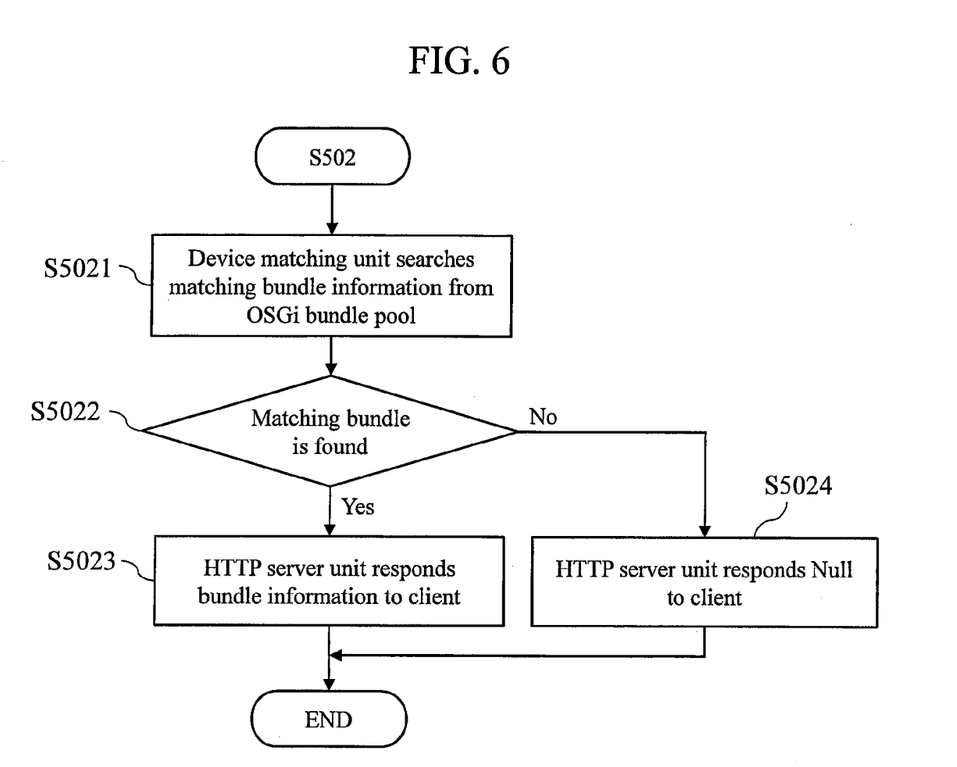
FIG. 6 is a diagram showing an operational flow of a distribution server 20 in step S502 of FIG. 5.

FIG. 6 is a diagram showing an operational flow of the distribution server 20 in step S502 of FIG. 5. Hereinafter, each of steps in FIG. 6 will be described.

(FIG. 6: Step S5021)

If the HTTP server 21 receives an HTTP request with device identification information from the gateway device 10, the HTTP server unit 21 handovers the device identification information to the device matching unit 22. The device matching unit 22 receives the device identification information and searches OSGi bundles matching with the device identification information from the OSGi bundle pool 23.

(FIG. 6: Step S5022)

If OSGi bundles matching with the device identification information were found in step S5021, the process flow proceeds to step S5023. If not found, the process flow proceeds to step S5024.

(FIG. 6: Step S5023)

The device matching unit 22 retrieves, from the OSGi bundle pool 23, bundle identification information (bundle symbol name and version) of the OSGi bundles found in step S5021, and handovers the information to the HTTP server unit 21. The HTTP server unit 21 sends the bundle identification information to the gateway device 10.

(FIG. 6: Step S5024)

The HTTP server unit 21 sends a Null (a HTTP response with emptied body portion) to the gateway device 10.

Figure 7:
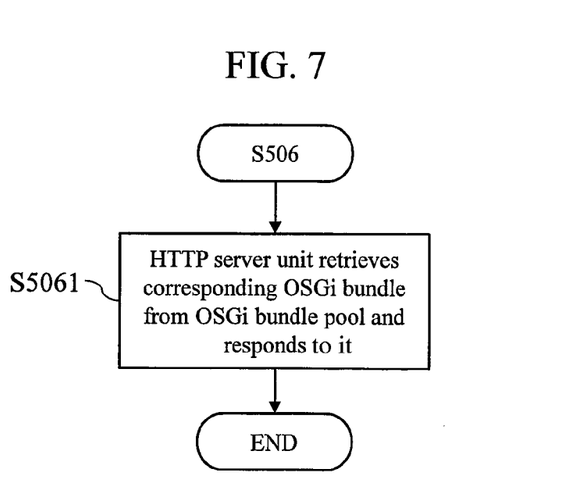
FIG. 7 is a diagram showing an operational flow of the distribution server 20 in step S506 of FIG. 5.

FIG. 7 is a diagram showing an operational flow of the distribution server 20 in step S506 of FIG. 5. Hereinafter, each of steps in FIG. 7 will be described.

(FIG. 7: Step S5061)

If the HTTP server unit 21 receives a HTTP request with bundle identification information (bundle symbol name and version) from the gateway device 10, the HTTP server unit 21 retrieves OSGi bundles corresponding to the bundle identification information from the OSGi bundle pool 23. The HTTP server unit 21 sends the OSGi bundles to the gateway device 10.

Figure 8:
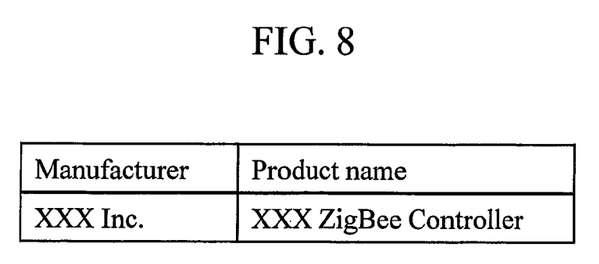
FIG. 8 is a diagram exemplifying a content of a HTTP request sent by a bundle acquisition unit 143 to the distribution server 20 in step S502 of FIG. 5.

FIG. 8 is a diagram exemplifying contents of HTTP requests that are sent by the bundle acquisition unit 143 to the distribution server 20 in step S502 of FIG. 5. The bundle acquisition unit 143 sends, to the distribution server 20, device identification information (in FIG. 8, manufacturer and product name) of USB devices or UPnP devices that are connected to the gateway device 10. The bundle acquisition unit 143 acquires identification information of OSGi bundles (bundle symbol name and version) corresponding to the device identification information.

Figure 9:
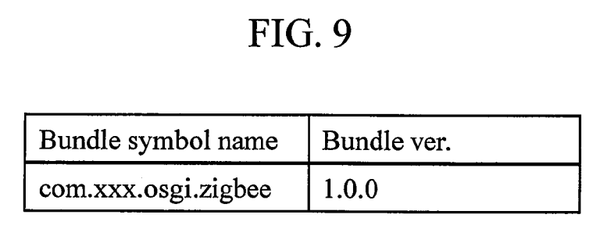
FIG. 9 is a diagram exemplifying a content of a HTTP response sent by the distribution server 20 to the bundle acquisition unit 143 in step S502 of FIG. 5.

FIG. 9 is a diagram exemplifying contents of HTTP responses that are sent by the distribution server 20 to the bundle acquisition unit 143 in step S502 of FIG. 5. The device matching unit 22 sends, through the HTTP server unit 21, bundle identification information (bundle symbol name and version number) matching with the device identification information received from the bundle acquisition unit 143.

Figure 10:
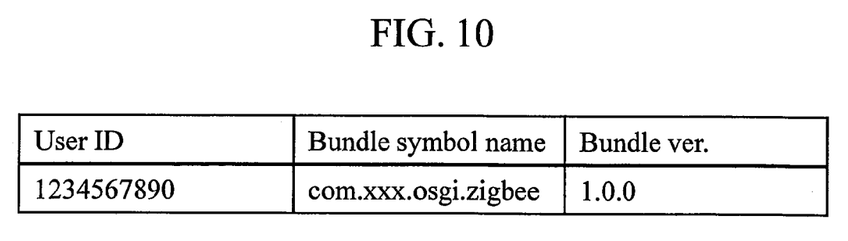
FIG. 10 is a diagram exemplifying a content of a HTTP message sent by the bundle acquisition unit 143 to a portal server 30 in the step S508 of FIG. 5.

FIG. 10 is a diagram exemplifying contents of HTTP messages that are sent by the bundle acquisition unit 143 to the portal server 30 in step S508 of FIG. 5. Under the configuration that the bundle identification information of installed and executed OSGi bundles is associated with user IDs and is sent to the portal server 30, the portal server 30 can recognize which OSGi bundle is installed on which user's gateway device 10.

Figure 11:
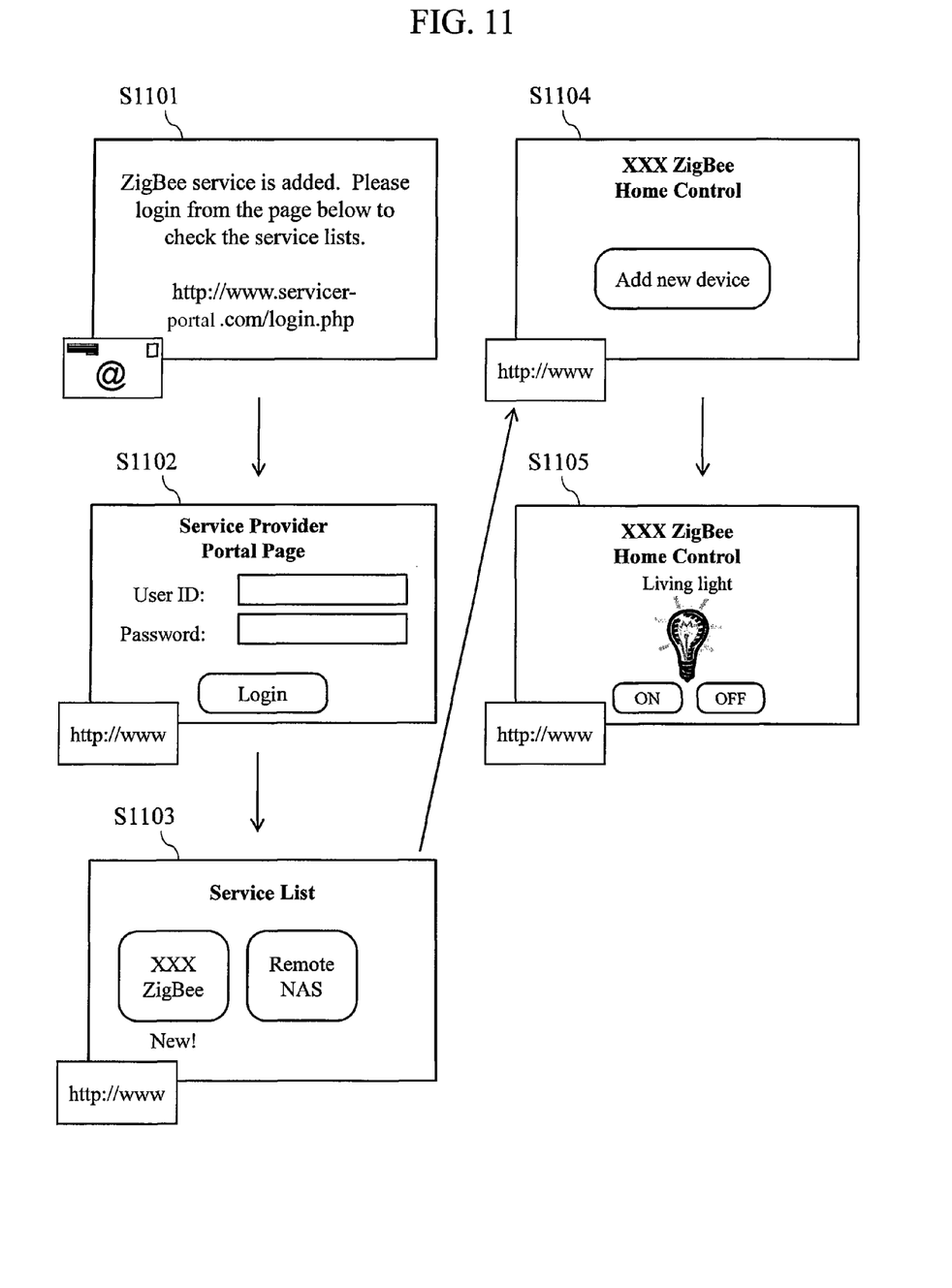
FIG. 11 is a diagram exemplifying a screen transition of a Web page provided by the portal server 30 to a user.

FIG. 11 is a diagram exemplifying screen transitions of Web pages provided by the portal server 30 to users. For the sake of convenience of explanation, step numbers are added. Hereinafter, screen transitions shown in each step of FIG. 11 will be described.

(FIG. 11: Step S1101)

The portal server 30 recognizes in step S508 of FIG. 5 that a new OSGi bundle is installed on the gateway device 10. The portal server 30 notifies to the user that functions corresponding to the OSGi bundle have become available.

(FIG. 11: Step S1101: Supplementation No. 1)

The portal server 30 notifies the list of OSGi bundles installed on the gateway device 10 because, it is necessary to notify the user how to utilize OSGi bundles installed on the OSGi framework 13 since the OSGi framework 13 usually does not include GUI (Graphical User Interface). In some cases, the OSGi framework includes internal web servers to provide screens in the form of Web pages. However, even in such cases, it is unknown whether the user accesses such pages frequently. Therefore, it is preferable if some pushing measures notify the list of OSGi bundles.

(FIG. 11: Step S1101: Supplementation No. 2)

The contents of notification in this step may be, simply describing how to utilize services provided by the OSGi bundles, linked to Web pages for utilizing the services, or the like. The first example is suitable in a case where the OSGi bundle provides services completed within the LAN of the user's home. The second example is suitable for services in which the services are utilized through servers provided by service providers.

(FIG. 11: Step S1101: Supplementation No. 3)

The notification in this step can be sent to predetermined email addresses owned by users. The notification can also be notified on Web pages if the gateway device 10 is manipulated through the Web pages.

(FIG. 11: Step S1102)

The user operates a Web browser and logins to a Web site or the like described in the notification received in step S1101 using the ID and the password or the like assigned by the service provider. The Web site may be provided by the portal server 30 or may not be on the portal server 30.

(FIG. 11: Step S1103)

When the user logins to the Web site, a list of services corresponding to OSGi bundles that are installed and executed in the gateway device 10 owned by the user is displayed. In FIG. 11, an example is shown in which the user inserts the ZigBee dongle 40 manufactured by XXX corporation into the gateway device 10 and OSGi bundles for manipulating the ZigBee bundle 40 are installed in the gateway device 10. The user can move, from the link in this page, to pages for manipulating the ZigBee device in the user's home.

(FIG. 11: Step S1104)

The screen exemplified in this step includes a functional button for adding ZigBee devices into the ZigBee network provided by the ZigBee dongle 40. If the button is pressed on this Web page and the ZigBee device in the user's home performs a procedure for joining the network (this procedure is also done by pressing a button on the device in many cases), the ZigBee device is added to the network and can be manipulated through this Web page.

(FIG. 11: Step S1105)

After adding the new ZigBee device to the ZigBee network in step S1104, the ZigBee device can be manipulated on this screen. For example, home appliances in the home can be remotely manipulated as ZigBee devices.

<Embodiment 1: Summary>

As described thus far, according to the embodiment 1, if a user connects a new external device to the gateway device 10, OSGi bundles necessary for utilizing the external device are automatically installed to the gateway device 10. As a result, the user is freed from operations for searching necessary OSGi bundles or for installing them, thereby decreasing the user's burdens. In addition, since the distribution server 20 is requested to distribute OSGi bundles upon detecting new external devices, the loads onto the distribution server 20 can be decreased.

In addition, according to the embodiment 1, the bundle acquisition unit 143 acquires OSGi bundles from the distribution server 20 only if no OSGi bundle corresponding to the new external device is installed on the OSGi framework 13. As a result, loads of the gateway device 10 and the distribution server 20 can be both decreased.

Embodiment 2

In the embodiment 1, an example is described in which when new external devices are connected to the gateway device 10 corresponding OSGi bundles are acquired. Following examples may be assumed as other cases where new OSGi bundles are required.
<Embodiment 2: OSGi Bundles Corresponding to User's Operation>

When a user of the gateway device 10 performs a specific operation on the gateway device 10 to issue an instruction to the gateway device 10, OSGi bundles corresponding to the instruction may be acquired from the distribution server 10. For example, at the time when the user attempts to manipulate the ZigBee device on the gateway device 10, OSGi bundles implementing ZigBee functions may be acquired from the distribution server 20.

In this case, the OSGi bundle pool 23 in the distribution server 20 has to include a table describing a relation between the instruction issued by the user to the gateway device 10 and the OSGi bundles corresponding to the instruction. Further, the bundle acquisition bundle 14 has to detects, in addition to detecting external devices connected to the gateway device 10, instructions issued by the user to the gateway device 10.
<Embodiment 2: OSGi Bundles Corresponding to Data Types>

When a new external device is connected to the gateway device 10, the external device may store specific types of data in some cases. The bundle acquisition bundle 14 may acquire OSGi bundles corresponding to the data types. For example, if the external device stores movie data, OSGi bundles implementing DLNA (Digital Living Network Alliance) player functions for playing the movie data may be acquired from the distribution server 20.

In this case, the OSGi bundle pool 23 in the distribution server 20 has to include a table describing a relation between the data types stored in the external device and OSGi bundles corresponding to the data types. Further, the bundle acquisition bundle 14 has to detects, in addition to detecting external devices connected to the gateway device 10, data types stored in the external devices.

Embodiment 3

Although USB device and UPnP device are exemplified as external devices connected to the gateway device 10 in the embodiment 1, other types of external devices may be detected. For example, PCI (Peripheral Component Interconnect) cards, IP (Internet Protocol) devices, or the like may be detected. Note that not any type of devices may be detected. The detected device has to be devices that are at least utilized by the user through the gateway device 10.

REFERENCE SIGNS LIST

10: gateway device, 11: OS, 12: Java VM, 13: OSGi framework, 14: bundle acquisition bundle, 141: device information acquisition unit, 1411: USB device information acquisition unit, 1412: JSR80 module, 1413: UPnP device information acquisition unit, 142: bundle deployment/execution unit, 143: bundle acquisition unit, 15: ZigBee bundle, 17: UPnP service, 20: distribution server, 21: HTTP server unit, 22: device matching unit, 23: OSGi bundle pool, 30: portal server, 40: ZigBee dongle, 100: OSGi system

The invention claimed is:

1. A non-transitory, computer-readable storage medium storing an OSGi program including a software module that implements an OSGi framework and the OSGi program causes a processor to execute a process in compliance with OSGi framework specifications in connection with a distribution server which stores a plurality of OSGi bundles, and a bundle table describing correspondences between device identification information, one or more instructions, one or more data types and the OSGi bundles, the process comprising:
   detecting an external device that is connected to an electronic device equipped with the processor;
   acquiring device identification information identifying the external device;
   requesting a distribution server to distribute a first OSGi bundle that corresponds to the device identification information from among the plurality of OSGi bundles; and
   receiving the first OSGi bundle corresponding to the device identification information of the external device from the distribution server and installing the received first OSGi bundle on the OSGi framework;
   detecting an instruction issued by a user to the external device or detecting a type of data stored in the external device;
   requesting a distribution server to distribute a second OSGi bundle that corresponds to the instruction issued by the user or the type of data from among a the plurality of OSGi bundles; and
   receiving the second OSGi bundle from the distribution server and installing the received second OSGi bundle on the OSGi framework,
   wherein, when the distribution server receives the request, from the electronic device, to distribute the first OSGi bundle, the distribution server specifies the first OSGi bundle corresponding to the device identification information of the external device by referring to the bundle table, and distributes the first OSGi bundle corresponding to the device identification information of the external device to the electronic device.

2. The non-transitory, computer-readable storage medium according to claim 1, wherein the external device is a USB device that is connected to a USB port of the electronic device, or the external device is a UPnP device that is connected to a network to which the electronic device belongs.

3. An electronic device comprising:
   a processor; and
   a non-transitory storage medium connected to the processor, where the non-transitory storage medium stores an OSGi program including a software module that implements an OSGi framework and the OSGi program causes the processor to execute a process in compliance with OSGi framework specifications in connection with a distribution server which stores a plurality of OSGi bundles, and a bundle table describing correspondences between device identification information, one or more instructions, one or more data types and the OSGi bundles, wherein the process includes:

detecting an external device that is connected to an electronic device equipped with the processor;

acquiring device identification information identifying the external device;

requesting a distribution server to distribute a first OSGi bundle that corresponds to the device identification information from among the plurality of OSGi bundles;

receiving the first OSGi bundle corresponding to the device identification information of the external device from the distribution server and installing the received first OSGi bundle on the OSGi framework;

detecting an instruction issued by a user to the external device or detecting a type of data stored in the external device;

requesting a distribution server to distribute a second OSGi bundle from among the plurality of OSGi bundles that corresponds to the instruction issued by the user or the type of data; and receiving the second OSGi bundle from the distribution server and installing the received second OSGi bundle on the OSGi framework, wherein, when the distribution server receives the request, from the electronic device, to distribute the first OSGi bundle, the distribution server specifies the first OSGi bundle corresponding to the device identification information of the external device by referring to the bundle table, and distributes the first OSGi bundle corresponding to the device identification information of the external device to the electronic device.

4. An OSGi system comprising:

an electronic device which has a processor and a non-transitory storage medium connected to the processor, where the non-transitory storage medium stores an OSGi program including a software module that implements an OSGi framework and the OSGi program causes the processor to execute a process in compliance with OSGi framework specifications; and a distribution server which stores a plurality of OSGi bundles, and a bundle table describing correspondences between device identification information, one or more instructions, one or more data types and the OSGi bundles, and wherein the process includes:

detecting an external device that is connected to the electronic device equipped with the processor;

acquiring device identification information identifying the external device;

transmitting to the distribution server a request to distribute a first one of the OSGi bundles corresponding to the device identification information of the external device;

receiving the first one of the OSGi bundles corresponding to the device identification information of the external device from the distribution server and installing the received first one of the OSGi bundles on the OSGi framework;

detecting an instruction issued by a user to the external device or detecting a type of data stored in the external device;

requesting a distribution server to distribute a second one of the OSGi bundles that corresponds to the instruction issued by the user or the type of data; and receiving the second one of the OSGi bundles from the distribution server and installing the second OSGi bundle on the OSGi framework, and wherein, when the distribution server receives the request, from the electronic device, to distribute the first one of the OSGi bundles, the distribution server specifies the first one of the OSGi bundles corresponding to the device identification information of the external device by referring to the bundle table, and distributes the first one of the OSGi bundles corresponding to the device identification information of the external device to the electronic device.

5. The OSGi system according to claim 4, wherein the process further includes:

receiving bundle identification information for identifying the first one of the OSGi bundles corresponding to the device identification information of the external device from the distribution server;

checking whether the first one of the OSGi bundles corresponding to the bundle identification information is already installed on the OSGi framework; and when the first one of the OSGi bundles corresponding to the bundle identification information is not installed on the OSGi framework, requesting the distribution server to distribute the first one of the OSGi bundles corresponding to the device identification information of the external device.

6. The OSGi system according to claim 4, further comprising:

a portal server that stores a list of the OSGi bundles that are installed on the OSGi framework, wherein the process further includes:

sending, to the portal server, installed bundle information identifying the OSGi bundles installed on the OSGi framework and user identification information identifying the electronic device, and wherein the portal server publishes to the user, on the basis of the installed bundle information and the user identification information received from the electronic device, the list of the OSGi bundles installed on the OSGi framework.

* * * * *